(12) United States Patent
Park et al.

(10) Patent No.: US 11,891,019 B2
(45) Date of Patent: Feb. 6, 2024

(54) SLIDING GLOVE BOX

(71) Applicant: HYUNDAI MOBIS Co., Ltd., Seoul (KR)

(72) Inventors: Ie Seob Park, Yongin-si (KR); Dong Il Song, Ulsan (KR); Dong Yong Choi, Suwan-si (KR); Chang Bok Park, Hwaseong-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 25 days.

(21) Appl. No.: 17/692,520

(22) Filed: Mar. 11, 2022

(65) Prior Publication Data
US 2023/0182646 A1   Jun. 15, 2023

(30) Foreign Application Priority Data
Dec. 9, 2021   (KR) .................. 10-2021-0175605

(51) Int. Cl.
 *B60R 7/06*   (2006.01)
(52) U.S. Cl.
 CPC ..................... *B60R 7/06* (2013.01)
(58) Field of Classification Search
 CPC ..... B60R 7/06; B60R 7/04; B60R 2011/0007; B60R 2011/005; B60R 2011/0084
 USPC ...................................... 296/37.12
 See application file for complete search history.

(56) References Cited

U.S. PATENT DOCUMENTS

| | | | | |
|---|---|---|---|---|
| 4,447,095 A | * | 5/1984 | Fielding | A47B 88/487 384/19 |
| 5,199,777 A | * | 4/1993 | Taima | A47B 88/463 312/319.1 |
| 5,385,405 A | * | 1/1995 | Hobbs | A47B 88/493 384/19 |

FOREIGN PATENT DOCUMENTS

| | | |
|---|---|---|
| FR | 3105131 A1 | 6/2021 |
| JP | 2017-052399 A | 3/2017 |
| KR | 0182889 B1 * | 5/1999 |
| KR | 10-0392878 B1 | 7/2003 |
| KR | 10-2022-0129906 A | 9/2022 |
| WO | 2007/046641 A1 | 4/2007 |
| WO | WO-2021070845 A1 * | 4/2021 |

OTHER PUBLICATIONS

Extended European Search Report dated Sep. 16, 2022, issued in corresponding European Patent Application No. 22163598.0.
Office Action issued in corresponding Korean Patent Application No. 10-2021-0175605 dated Jul. 18, 2023, with English translation.

* cited by examiner

*Primary Examiner* — Pinel E Romain
(74) *Attorney, Agent, or Firm* — MORGAN, LEWIS & BOCKIUS LLP

(57) ABSTRACT

The present disclosure provides a sliding glove box including a glove box including an inner space for accommodating an object and a case which accommodates the glove box, wherein a plurality of wheels are disposed at each of two sides of the glove box, the plurality of wheels move on a rail disposed in the case, and at least one of the plurality of wheels includes one side that is in contact with the rail.

6 Claims, 5 Drawing Sheets

[FIG. 1]
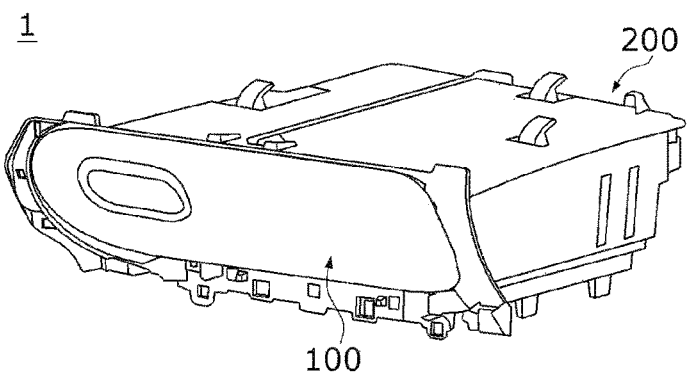
[FIG. 2]
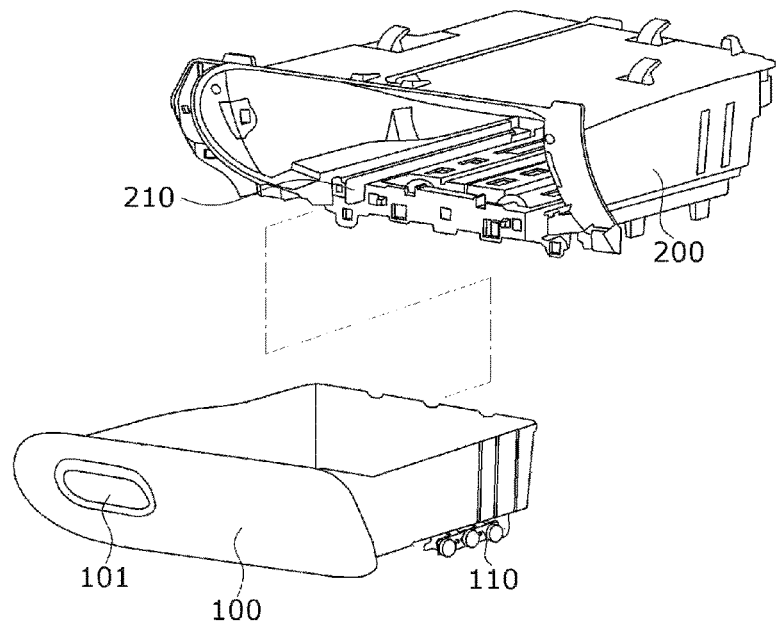

[FIG. 3]
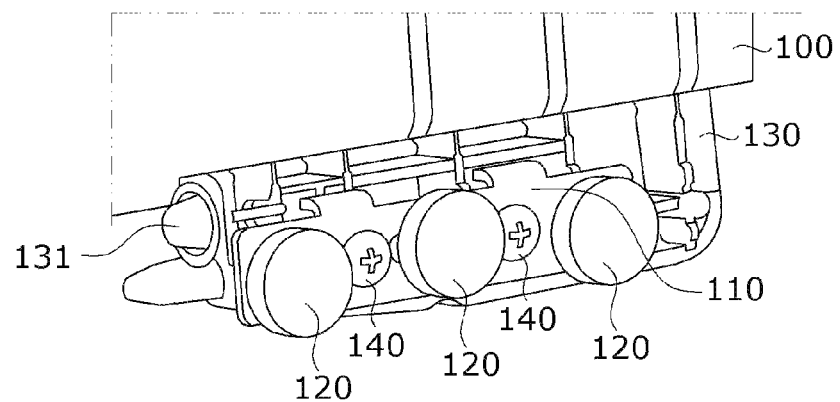
[FIG. 4]
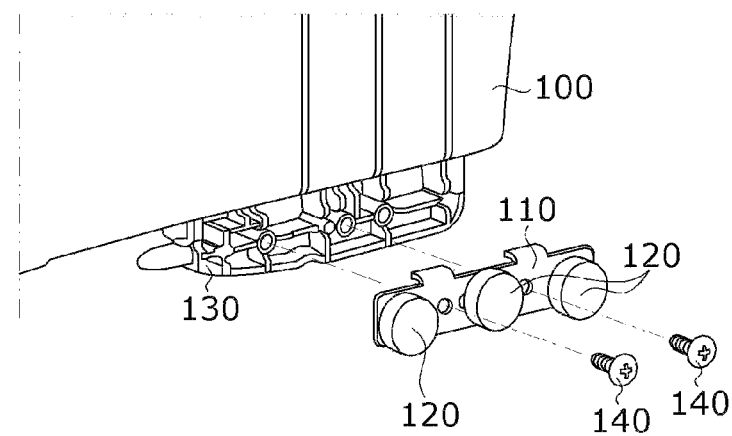

[FIG. 5]
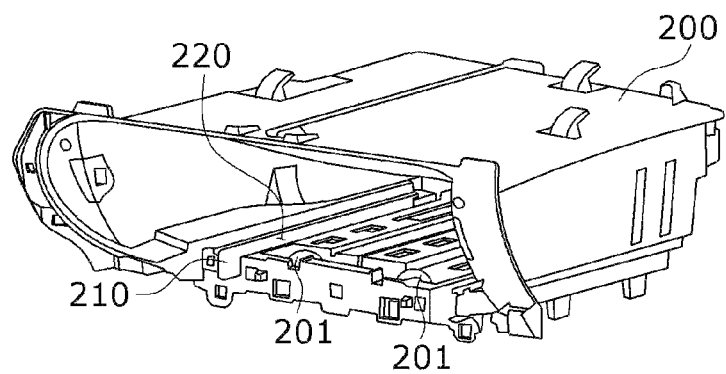
[FIG. 6]
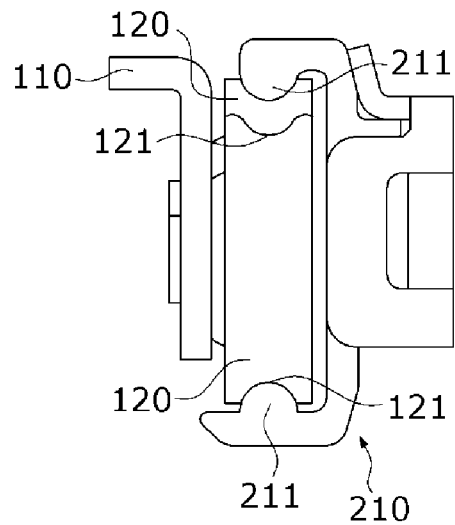

[FIG. 7]
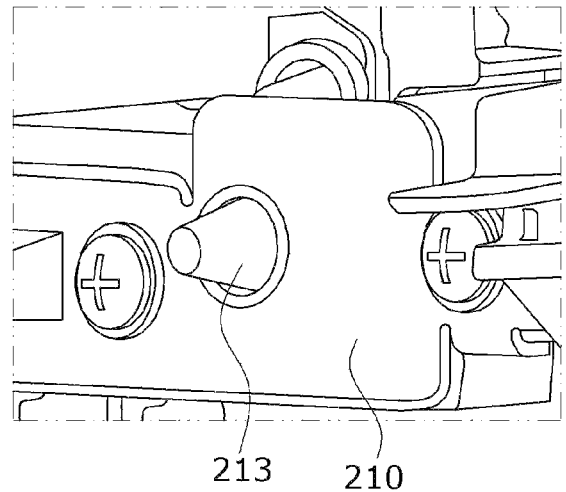
[FIG. 8]
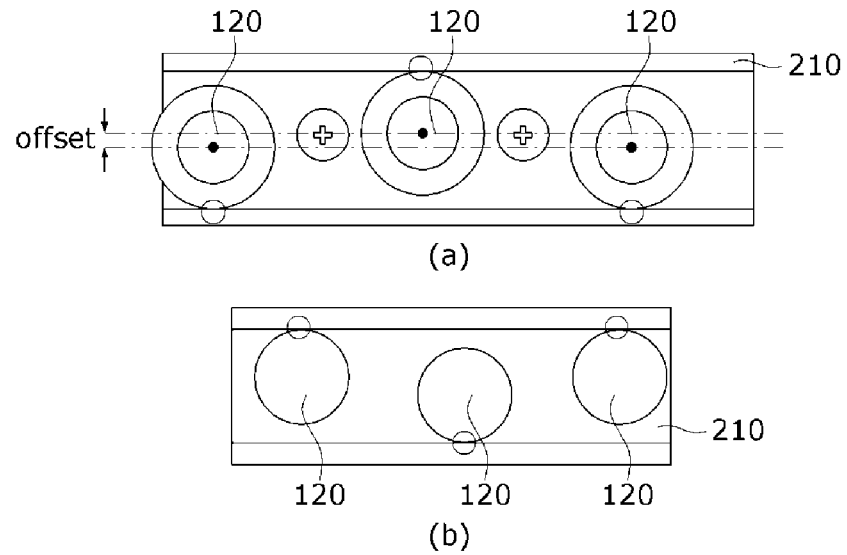

[FIG. 9]
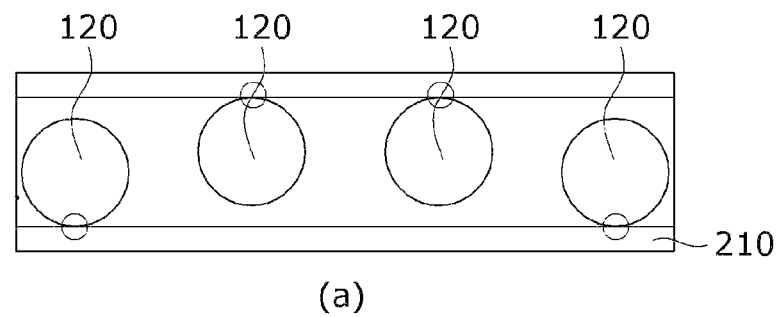
(a)
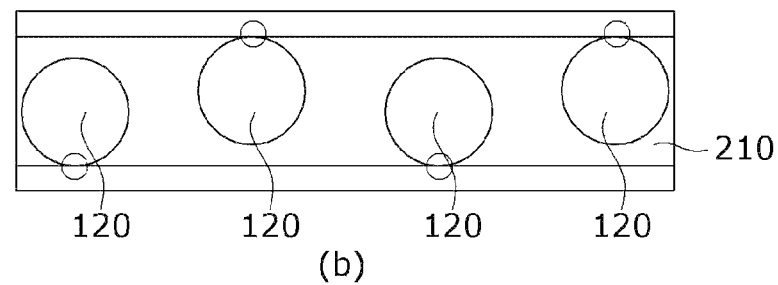
(b)

SLIDING GLOVE BOX

CROSS-REFERENCE TO RELATED APPLICATION

This application claims priority to and the benefit of Korean Patent Application No. 10-2021-0175605, filed on Dec. 9, 2021, the disclosure of which is incorporated herein by reference in its entirety.

BACKGROUND

1. Technical Field

The present disclosure relates to a sliding glove box. More specifically, the present disclosure relates to a sliding glove box in which a problem occurring in a double rail or single rail of a glove box of a closed type design is solved.

2. Discussion of Related Art

Generally, an instrument panel called a dashboard is installed in front of a driver's seat of a vehicle, and an instrument cluster, in which various instruments and warning lights aiding in more safe driving of the vehicle by allowing a driver to frequently check a state of the traveling vehicle to drive the vehicle more stably and smoothly are gathered, is installed on the instrument panel.

That is, in the instrument cluster installed on the instrument panel, a tachometer for displaying revolutions per minute (RPM) of an engine to aid the driver in selecting a time of changing speed determined by the driver while traveling and to recognize an over rotation state of the engine to prevent the over rotation state, a speedometer for displaying a vehicle running speed to prevent overspeed, a trip odometer for displaying a traveling distance of the vehicle, a cumulative odometer, and the like are installed.

In addition, in the instrument cluster, various attention warning lights such as a turn indicator lamp, an emergency warning lamp, a battery warning lamp which is turned on when a battery is not charged, and a warning lamp which is turned on when an amount of engine oil is low as well as a thermometer for displaying an engine coolant temperature, and a fuel gauge for displaying a remaining fuel in a fuel tank are gathered, and various levers or buttons necessary for operating heating and cooling devices such as a heater and an air conditioner are installed at a right side of the instrument cluster.

In addition, since a portion positioned in front of a passenger seat in the instrument panel is too far away from a sight of the driver, the instruments and warning lights are not installed therein, and thus a glove box, in which objects necessary for the driver are accommodated, is installed using a space thereof.

The glove box may be divided into an open type glove box or closed type glove box.

When a double rail of an open type structure is applied to the closed type glove box, there is a problem in that a capacity of the glove box decreases.

When a single rail is applied to the closed type glove box, since a length of the rail is too long, there is a problem in that a passenger is seriously injured due to collision with the long rail when a vehicle crash accident occurs.

In addition, when the single rail is simply cut in order to reduce a length of the conventional single rail structure, since a retainer may be pulled out of an inner rail, an operational problem may occur.

SUMMARY

The present disclosure is directed to solving a problem occurring when a double rail or single rail is applied to a closed type glove box.

Objectives to be solved by the present disclosure are not limited to the above-described objectives, and other objectives, which are not described above, will be clearly understood by those skilled in the art from the following description.

According to an aspect of the present disclosure, a sliding glove box may include a glove box including an inner space for accommodating an object and a case which accommodates the glove box, in which a plurality of wheels are disposed at each of two sides of the glove box, the plurality of wheels move on a rail disposed in the case, and at least one of the plurality of wheels includes one side that is in contact with the rail.

The rail may have a "⊂" shape, and the wheel may be disposed in an accommodation space formed in the rail.

The plurality of wheels may be installed on fixing brackets and fixed to fixing parts disposed at the two sides of the glove box.

The fixing parts may protrude from a lower portion of the glove box.

The rail may be disposed in a groove formed in a lower surface of the case.

The number of the plurality of wheels may be at least three, and each of the plurality of wheels may be in contract with any one side of an upper portion or a lower portion of the rail.

The plurality of wheels may be disposed to be alternately in contact with the upper portion and the lower portion of the rail.

A stopper may be disposed on an end portion of the rail, and a bumper may be disposed at one side of one of the fixing parts.

At least one of the stopper or the bumper may include an elastic material.

An accommodation groove may be disposed in the wheel, and protruding parts mat be inserted into the accommodation groove.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which:

FIG. 1 is a perspective view illustrating a sliding glove box according to an embodiment of the present disclosure;

FIG. 2 is a view illustrating a state in which components of FIG. 1 are separated;

FIG. 3 is a view illustrating a wheel installation structure of the glove box which is a component of FIG. 2;

FIG. 4 is an exploded perspective view illustrating the wheel installation structure of FIG. 3;

FIG. 5 is a view illustrating a structure of a case which is a component of FIG. 2;

FIG. 6 is a view illustrating a coupling structure of a wheel and a rail in FIG. 1;

FIG. 7 is a view illustrating a structure of a stopper disposed in the case of FIG. 2; and FIGS. 8 and 9 are views illustrating examples of a layout of the wheel which is a component of FIG. 2.

DETAILED DESCRIPTION OF EXEMPLARY EMBODIMENTS

Hereinafter, exemplary embodiments of the present disclosure will be described in detail with reference to the accompanying drawings.

However, the technical spirit of the present disclosure is not limited to some embodiments which will be described and may be realized using various other embodiments, and at least one component of the embodiments may be selectively coupled, substituted, and used in the range of the technical spirit.

In addition, unless clearly and specifically defined otherwise by context, all terms (including technical and scientific terms) used herein can be interpreted as having customary meanings to those skilled in the art, and meanings of generally used terms, such as those defined in commonly used dictionaries, will be interpreted by considering contextual meanings of the related technology.

In addition, the terms used in the embodiments of the present disclosure are considered in a descriptive sense and not for limiting the present disclosure.

In the present specification, unless clearly indicated otherwise by the context, singular forms include the plural forms thereof, and in a case in which "at least one (or one or more) among A, B, and C" is described, this may include at least one combination among all possible combinations of A, B, and C.

In addition, in descriptions of components of the present disclosure, terms such as "first," "second," "A," "B," "(a)," and "(b)" can be used.

The terms are only to distinguish one element from another element, and an essence, order, and the like of the element are not limited by the terms.

In addition, it should be understood that, when an element is referred to as being "connected or coupled" to another element, such a description may include both a case in which the element is directly connected or coupled to another element and a case in which the element is connected or coupled to another element with still another element disposed therebetween.

In addition, in a case in which any one element is described as being formed or disposed "on or under" another element, such a description includes both a case in which the two elements are formed or disposed in direct contact with each other and a case in which one or more other elements are interposed between the two elements. In addition, when one element is described as being disposed "on or under" another element, such a description may include a case in which the one element is disposed at an upper side or a lower side with respect to another element.

Hereinafter, in the detailed description of the example embodiments of the disclosure with reference to the accompanying drawings, components that are the same or correspond to each other will be denoted by the same reference numerals regardless of the figure numbers, and redundant descriptions will be omitted.

FIGS. 1 to 9 are views clearly illustrating main feature portions in order to conceptually and clearly understand the present disclosure, and thus, various modifications of the drawings are expected, and the scope of the present disclosure is not necessarily limited by specific shapes illustrated in the drawings.

FIG. 1 is a perspective view illustrating a sliding glove box according to an embodiment of the present disclosure, FIG. 2 is a view illustrating a state in which components of FIG. 1 are separated, FIG. 3 is a view illustrating a wheel installation structure of the glove box which is a component of FIG. 2, FIG. 4 is an exploded perspective view illustrating the wheel installation structure of FIG. 3, FIG. 5 is a view illustrating a structure of a case which is a component of FIG. 2, FIG. 6 is a view illustrating a coupling structure of a wheel and a rail in FIG. 1, FIG. 7 is a view illustrating a structure of a stopper disposed in the case of FIG. 2, and FIGS. 8 and 9 are views illustrating examples of a layout of the wheel which is a component of FIG. 2.

Referring to FIGS. 1 to 9, a sliding glove box 1 according to the embodiment of the present disclosure may include a glove box 100 and a case 200.

The glove box 100 includes an inner space capable of accommodating an object. The glove box 100 may include a handle 101 for opening or closing the glove box 100.

A plurality of wheels 120 may be disposed on each side surface of the glove box 100. The plurality of wheels 120 may be disposed to stably move along rails 210, and at least three wheels 120 may be disposed on each of the both side surfaces of the glove box 100 in order to prevent vertical movement when moving on the rail 210.

The wheel 120 may have a structure directly installed on the glove box 100. However, the wheels 120 may be fixed to the glove box 100 using separate fixing brackets 110 for ease of operation to easily replace the wheel 120 when the wheel 120 is broken.

In addition, the fixing brackets 110 may be fixed to fixing parts 130 disposed at two sides of the glove box 100. As an embodiment, the fixing part 130 may be provided as a structure protruding from a lower portion of the glove box 100 such that the volume of the inner space of the glove box 100 is not decreased, and thus the utilization of the inner space of the glove box 100 may not be degraded.

The fixing bracket 110 may include one bent portion and may be disposed in a structure inserted into a fixing groove formed in the fixing bracket 110, and when the fixing bracket 110 is assembled, a position of the fixing bracket 110 may be fixed, and the fixing bracket 110 may be fixed to the fixing part 130 using a separate coupling member 140.

The case 200 may include an inner space formed to accommodate the glove box 100. A plurality of drive wheels 201 may be provided on a lower surface of the case 200 so that the glove box 100 moves easily in a sliding manner.

In addition, the rails 210, on which the plurality of wheels 120 disposed on the both side surfaces of the glove box 100 are seated, may be disposed in the inner space of the case 200.

The rails 210 may be disposed in seating grooves 220 formed in the lower surface of the case 200. The seating grooves 220 formed in the lower surface of the case 200 may be provided in a shape recessed downward from the case 200, and the rails 210 may be disposed on side surfaces of the seating grooves 220.

The rail 210 may be formed in a "⊂" shape, and the wheel 120 may be disposed in an accommodation space formed in the rail 210. In this case, protruding parts 211 may be disposed on upper and lower portions of the rail 210 to face each other, an accommodation groove 121 may be formed in an outer circumferential surface of the wheel 120, and the protruding parts 211 may be inserted into the accommodation groove 121. Specifically, the accommodation groove 121 may be concavely formed in the outer circumferential surface of the wheel 120 in a circumferential direction. In addition, the protruding parts 211 may be disposed in the accommodation groove 121. Accordingly, the protruding parts 211 may guide movement of the wheel 120.

As an embodiment, the protruding part 211 may be formed in the form extending along the rail 210 and may include a curved surface in order to minimize a frictional force.

The accommodation groove 121 having a curved surface to be engaged with the protruding part 211 may be formed in the wheel 120 inserted into the rail 210.

As described above, since the wheel 120 inserted into the rail 210 moves in a state in which the accommodation groove 121 are inserted into the protruding parts 211, the wheel 120 is prevented from being separated from the rail 210.

A stopper 213 may be disposed on an end portion of the rail 210, and a bumper 131 may be disposed at one side of the fixing part 130. In the case of the glove box 100 having a sliding structure, since the glove box 100 is moved in a sliding manner according to a manipulation of a user, there is a possibility of separation of the wheel 120 from the rail 210.

In order to prevent such a problem, the bumper 131 may be disposed on the front of the fixing part 130 protruding downward from the glove box 100, and when the glove box 100 moves, the bumper 131 may come into contact with the stopper 213 disposed on the end portion of the rail 210 to prevent separation of the wheel 120.

As an embodiment, at least one of the stopper 213 and the bumper 131 may be formed of an elastic material to absorb impact when the bumper 131 collides with the stopper 213.

In addition, in the present disclosure, at least one of the plurality of wheels 120 disposed on the rail 210 may be disposed such that one side thereof is in contact with the rail 210.

When the wheels 120 disposed on the rail 210 are disposed to be in contact with the upper and lower portions of the rail 210, gaps may be generated due to product tolerances and may cause wobble of the wheels 120 or separation of the wheels 120 from the rail 210 while moving along the rail 210.

In the present disclosure, in order to cope with a product distribution, at least one of the plurality of wheels 120 may be disposed such that one side thereof is in contact with the rail 210.

In the present disclosure, at least three wheels 120 may be installed on the fixing bracket 110 for stable contact between the wheels 120 and the rail 210.

FIGS. 8A and 8B are views illustrating examples of a case in which three wheels 120 are disposed.

Referring to FIG. 8, the plurality of wheels 120 may be disposed to be in contact with any one side of the upper portion and the lower portion of the rail 210. As an embodiment, the plurality of wheels 120 may be alternately in contact with the upper portion and the lower portion of the rail 210. Specifically, a rotation center of the wheel 120 in contact with the upper portion of the rail 210 and a rotation center of the wheel 120 in contact with the rail 210 may be disposed to have a predetermined off-set. In this case, the wheel 120 in contact with the upper portion of the rail 210 may be referred to as an upper wheel, and the wheel 120 in contact with the lower portion of the rail 210 may be referred to as a lower wheel.

In the wheels 120 disposed in a line, when a first wheel 120 is in contact with a lower end of the rail 210, the wheels 120 may be disposed to be sequentially in contact with the lower end, an upper end, and the lower end. In addition, when the first wheel 120 is in contact with the upper end of the rail 210, the wheels 120 may be disposed to be sequentially in contact with the upper end, the lower end, and the upper end. Accordingly, when the glove box 100 moves, a tilting phenomenon of the glove box 100 may be prevented.

FIGS. 9A and 9B are views illustrating examples of a case in which four wheels 120 are disposed.

Referring to FIG. 9, even when four wheels 120 are disposed, the wheels 120 may be disposed to be alternately in contact with the upper end, the lower end, the upper end, and the lower end. In addition, as illustrated in FIG. 8A, the wheels 120 may be disposed to be sequentially in contact with the lower end, the upper end, the upper end, and the lower end of the rail 210.

Referring to layouts of the wheels 120 of FIGS. 8 and 9, when four wheels 120 are disposed to be sequentially in contact with the upper end, the upper end, the lower end, and the lower end, the glove box 100 may be inclined due to product tolerances. Accordingly, for stable contact of the wheel 120 regardless of the number of the wheels 120, the wheels 120 may be disposed to be sequentially in contact with the upper end, the lower end, and the upper end or the lower end, the upper end, and the lower end.

According to the embodiments, there is an effect in that a capacity of a glove box of a closed type design is secured.

In addition, since a length of a rail is minimized, a free space prepared for a vehicle crash can be secured, and thus the performance thereof can be improved.

In addition, operational quality can be improved by reducing an operational problem occurring due to a product distribution of outer rails, retainers, and inner rails by using a distribution absorption structure in which a partial touch is performed using a wheel.

Various useful advantages and effects of the present disclosure are not limited to the above-described content and may be more easily understood while specific embodiments of the present disclosure are described.

As described above, the embodiments of the present disclosure have been described with reference to the accompanying drawings.

The above description is only an example describing a technological scope of the present disclosure, and various changes, modifications, and replacements may be made by those skilled in the art without departing from the spirit and scope of the present disclosure. Therefore, the embodiments disclosed above and in the accompanying drawings should be considered in a descriptive sense only and not to limit the technological scope, and the technological scope of the present disclosure is not limited by the embodiments and the accompanying drawings. The scope of the present disclosure should be interpreted by the appended claims and encompass all equivalents falling within the scope of the appended claims.

What is claimed is:

1. A sliding glove box comprising:
a glove box including an inner space for accommodating an object; and
a case which accommodates the glove box,
wherein a plurality of wheels are disposed at each of two sides of the glove box,
the plurality of wheels are configured to move on a rail disposed in the case,
at least one of the plurality of wheels has one side that is in contact with the rail,
the rail has a "⊂" shape, the plurality of wheels are disposed in an accommodation space formed in the rail, the plurality of wheels are installed on fixing brackets which are detachably fixed to fixing parts disposed at the two sides of the glove box, the fixing parts protrude from a lower portion of the glove box, and the rail is disposed in a seating groove formed in a lower surface of the case, wherein the case includes an upper surface, the lower surface, and two side surfaces surrounding the glove box.

2. The sliding glove box of claim 1, wherein:

the number of the plurality of wheels is at least three; and each of the plurality of wheels is in contact with any one side of an upper portion or a lower portion of the rail.

3. The sliding glove box of claim 2, wherein the plurality of wheels are disposed to be alternately in contact with the upper portion and the lower portion of the rail.

4. The sliding glove box of claim 1, wherein:

a stopper is disposed on an end portion of the rail; and a bumper is disposed at one side of one of the fixing parts.

5. The sliding glove box of claim 4, wherein at least one of the stopper or the bumper includes an elastic material.

6. The sliding glove box of claim 1, wherein:

protruding parts are disposed on an upper portion and a lower portion of the rail;

an accommodation groove is defined in each of the wheels; and the protruding parts are inserted into the accommodation groove.

* * * * *